W. J. KENNEY & H. P. GROHN.
VALVE MECHANISM.
APPLICATION FILED FEB. 16, 1914.

1,095,281.

Patented May 5, 1914.

6 SHEETS—SHEET 3.

Witnesses:

Inventors:
William J. Kenney
Henry P. Grohn

W. J. KENNEY & H. P. GROHN.
VALVE MECHANISM.
APPLICATION FILED FEB. 16, 1914.
1,095,281.
Patented May 5, 1914.
6 SHEETS—SHEET 4.
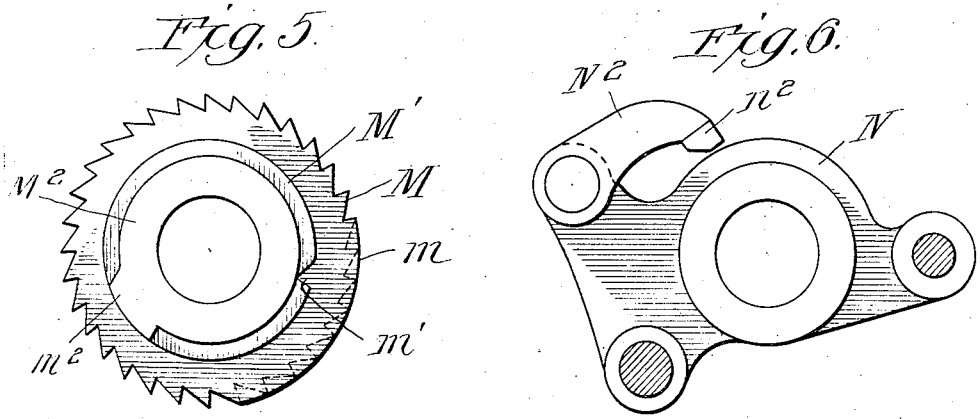
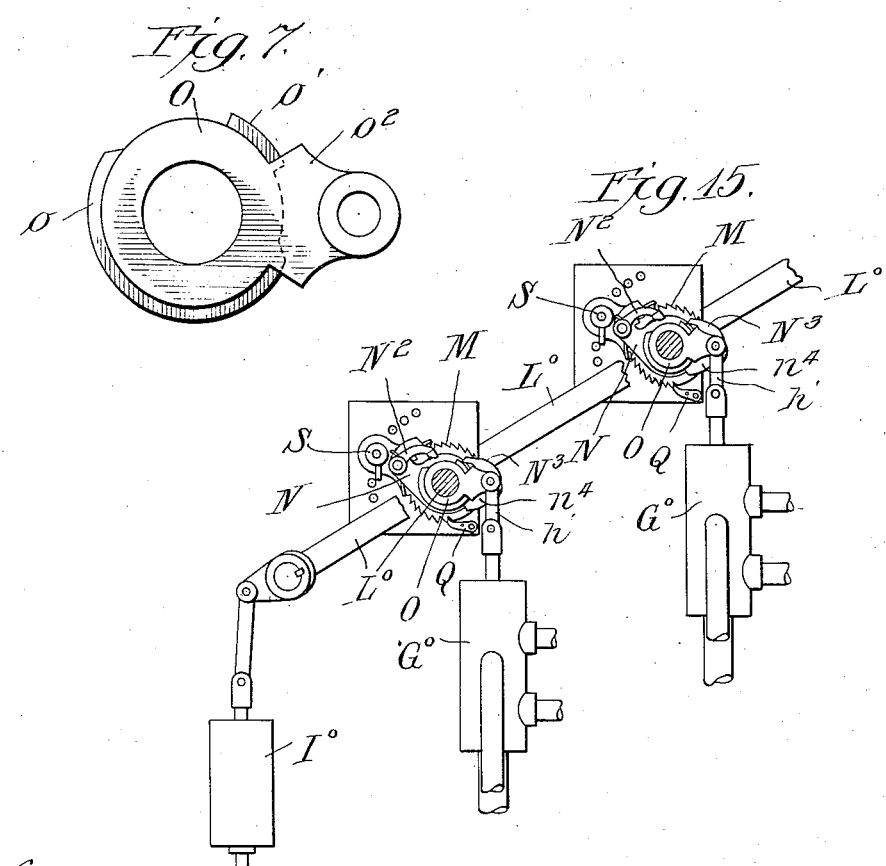
Witnesses:
Harry S. Gaither
Ruth E. Zitterwall
Inventors:
William J. Kenney
Henry P. Grohn
by Chamberlin & Freudenreich, Attys W. J. KENNEY & H. P. GROHN.
VALVE MECHANISM.
APPLICATION FILED FEB. 16, 1914.
1,095,281.
Patented May 5, 1914.
6 SHEETS—SHEET 5.
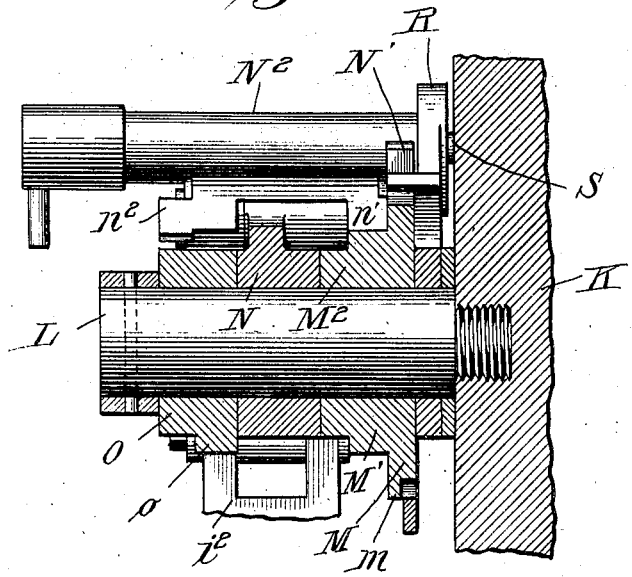
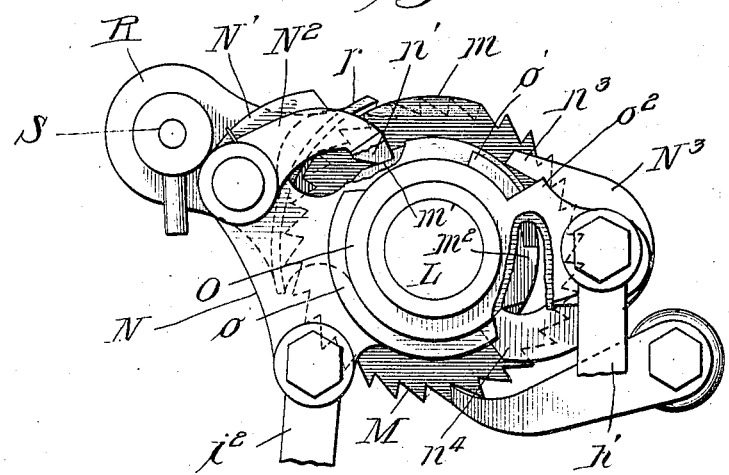

W. J. KENNEY & H. P. GROHN.
VALVE MECHANISM.
APPLICATION FILED FEB. 16, 1914.

1,095,281.

Patented May 5, 1914.

6 SHEETS—SHEET 6.

Witnesses:
Harry S. Gaither
Ruth E. Zetterwall

Inventors:
William J. Kenney
Henry P. Grohn
by Chamberlin Freudenreich
Attys

UNITED STATES PATENT OFFICE.

WILLIAM J. KENNEY, OF WILMETTE, AND HENRY P. GROHN, OF CHICAGO, ILLINOIS, ASSIGNORS TO UNDER-FEED STOKER COMPANY OF AMERICA, OF CHICAGO, ILLINOIS, A CORPORATION OF NEW JERSEY.

VALVE MECHANISM.

1,095,281.        Specification of Letters Patent.        Patented May 5, 1914.

Original application filed June 10, 1910, Serial No. 566,139. Divided and this application filed February 16, 1914. Serial No. 818,840.

*To all whom it may concern:*

Be it known that we, WILLIAM J. KENNEY and HENRY P. GROHN, citizens of the United States, residing, respectively, at Wilmette and Chicago, county of Cook, State of Illinois, have invented a certain new and useful Improvement in Valve Mechanism, and declare the following to be a full, clear, and exact description of the same, such as will enable others skilled in the art to which it pertains to make and use the same, reference being had to the accompanying drawings, which form a part of this specification.

Our invention has for its object to produce a simple and novel valve mechanism by means of which power impulses may be produced at any desired rate through the admission and exhaust of steam, without varying the strength of the impulses or making it necessary to rely upon a variation in the throw of the valves or in the extent to which the valves are opened.

Figure 1:
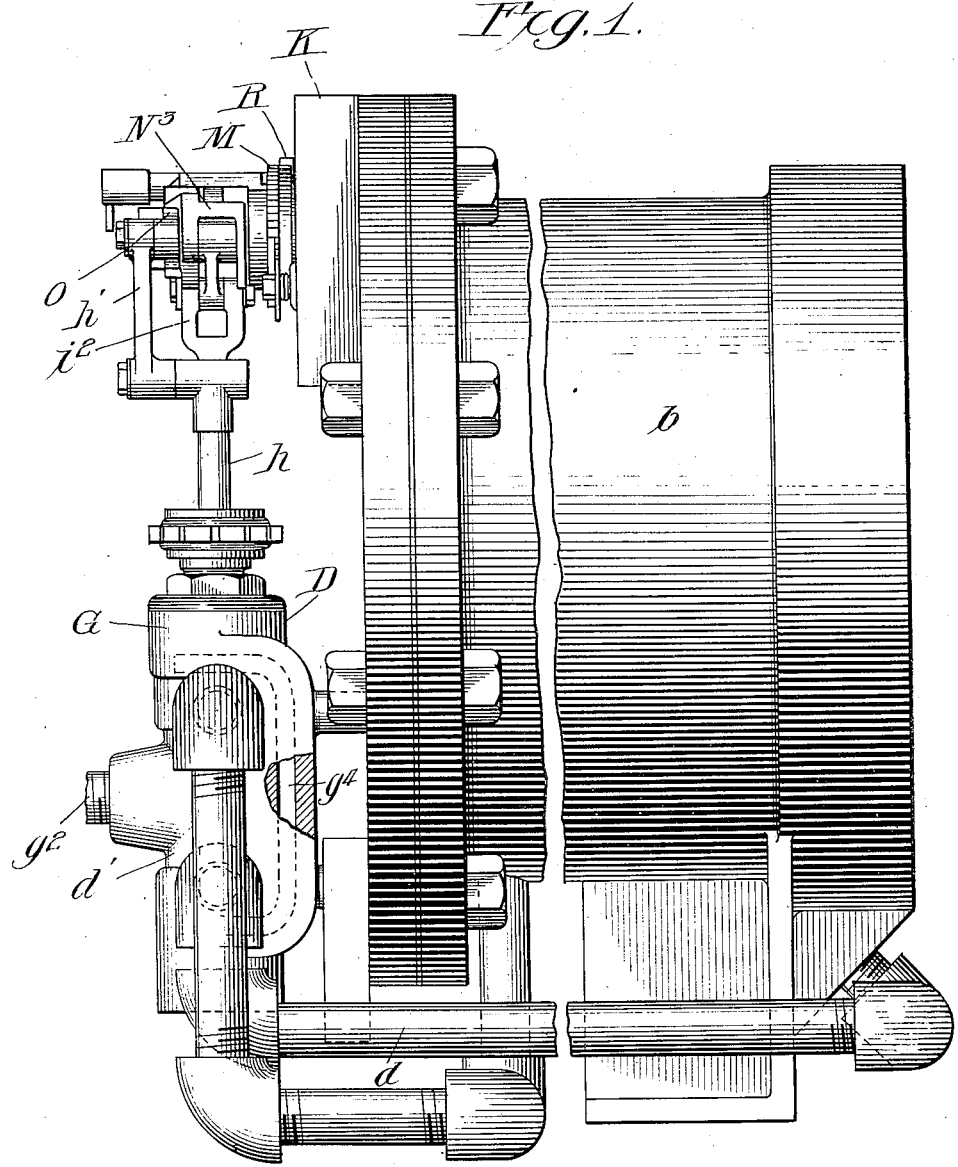
Figure 2:
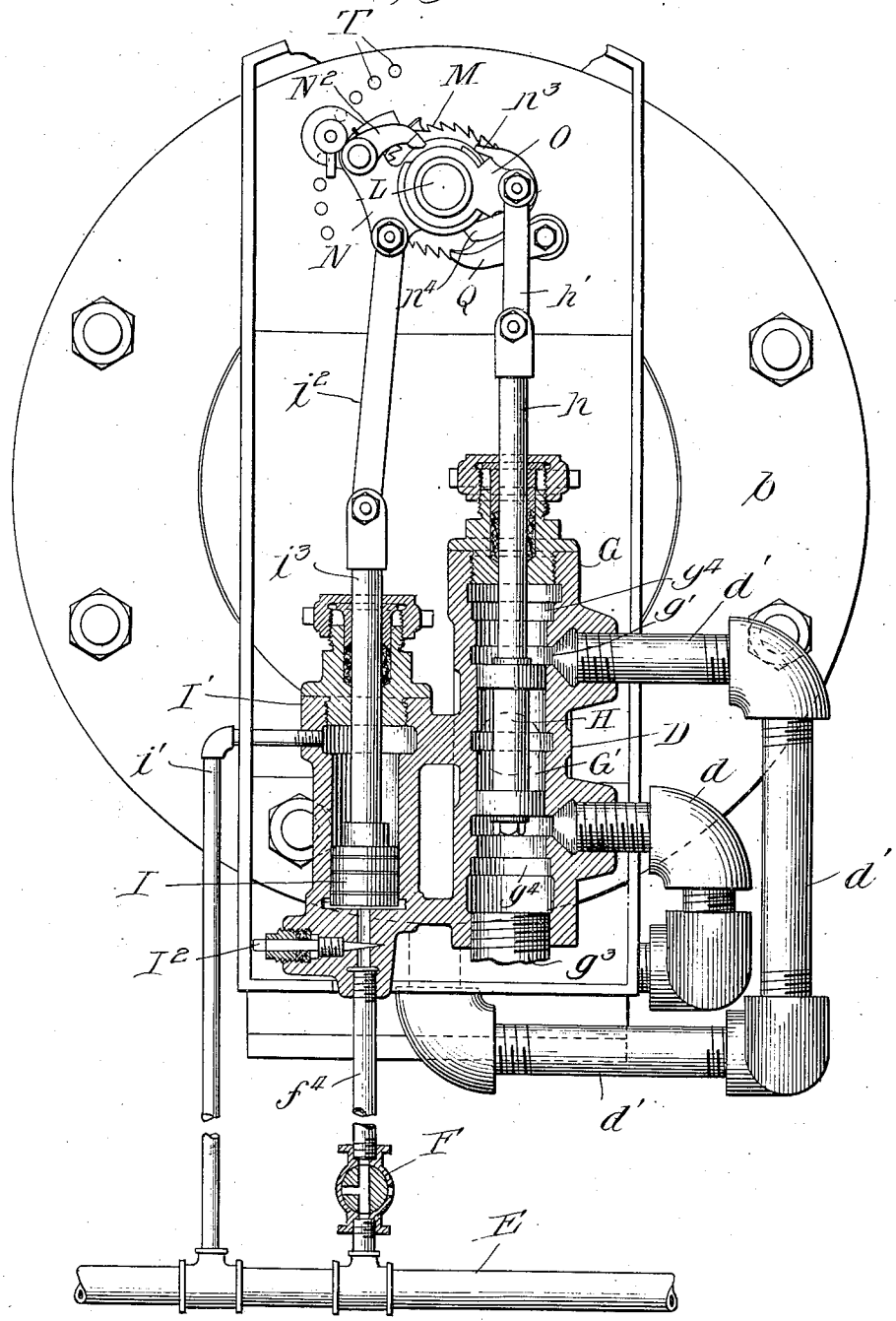
Figure 3:
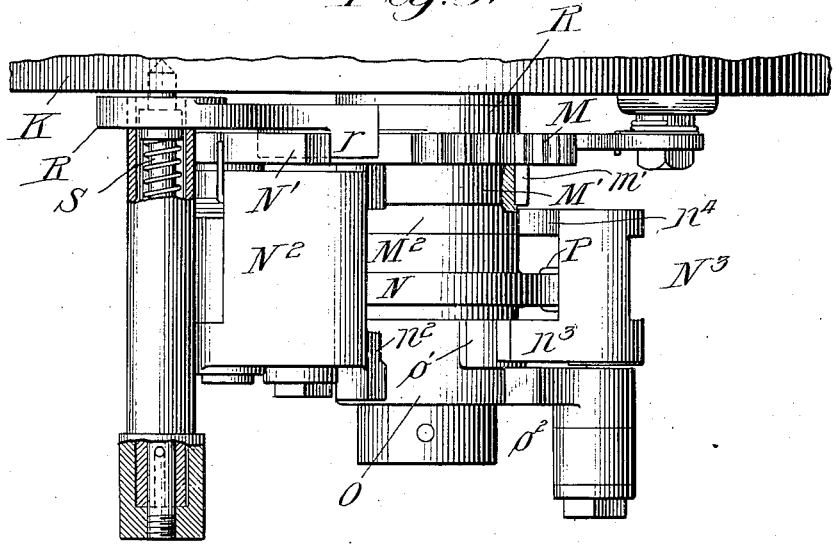
Figure 4:
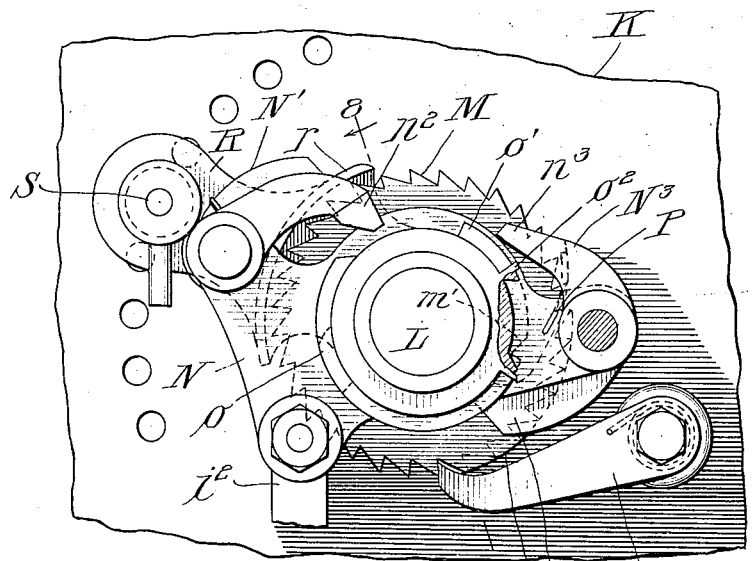
Figure 10:
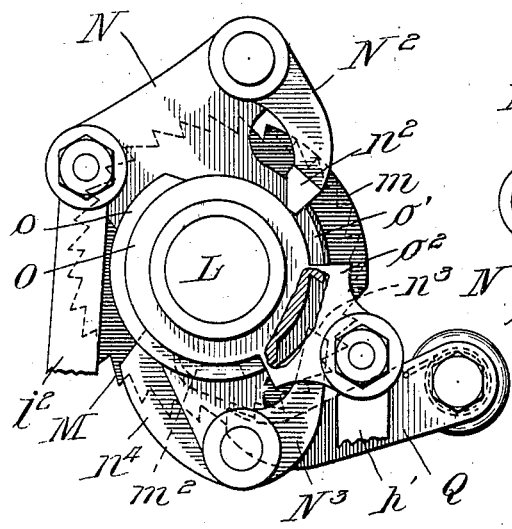
Figure 11:
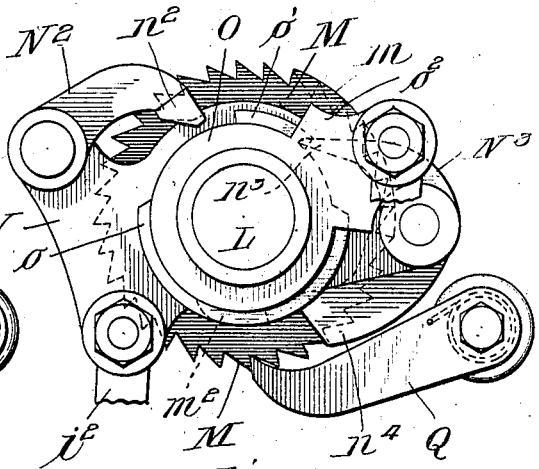
Figure 13:
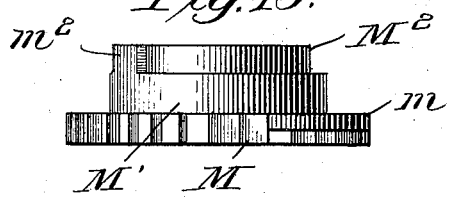
Figure 12:
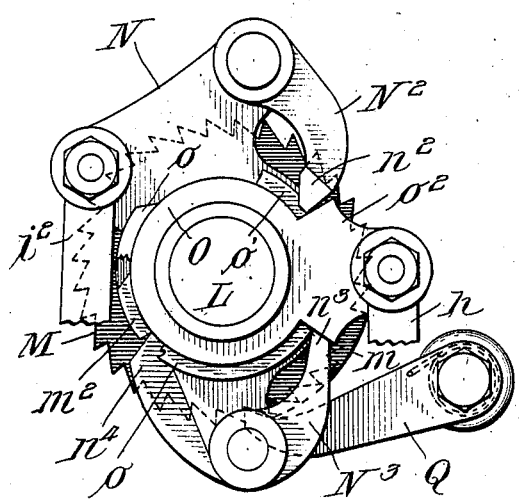
Figure 14:
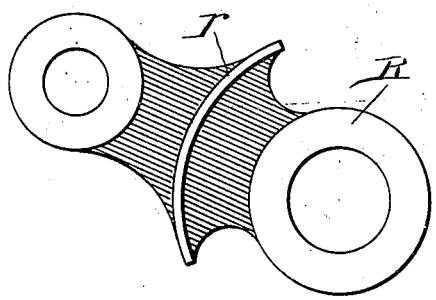

The various features of novelty whereby our invention is characterized will hereinafter be pointed out with particularity in the claims; but, for a full understanding of our invention in its various aspects, and the various objects and advantages thereof, reference is to be had to the following detailed description taken in connection with the accompanying drawings, wherein: Figure 1 is a side view on an enlarged scale showing a stoker cylinder and our improved valve and valve actuating mechanism adjacent thereto, parts of the cylinder being broken away; Fig. 2 is a view looking toward the right in Fig. 1, the valve casing and the cylinder containing the controlling piston being shown in section; Fig. 3 is a plan view on an enlarged scale of the selective connecting mechanism between the valve and controlling piston, the view being one looking down in Fig. 2; Fig. 4 is a side elevation of the selective mechanism, the positions of the parts being those shown in Fig. 2, and portions being broken away in order to expose other portions normally hidden; Figs. 5, 6 and 7 are side views showing the three principal members of the selective mechanism in the same relative angular positions as in Fig. 4; Fig. 8 is a section taken on line 8—8 of Fig. 4, looking in the direction of the arrows; Fig. 9 is a view similar to Fig. 4 showing the position of the parts just before the valve is caused to begin its first downward stroke; Fig. 10 is a view similar to Fig. 9 showing the condition of the parts at the completion of the downward stroke of the valve; Fig. 11 is a view similar to Figs. 9 and 10, showing the condition of the parts just as the valve reaches the upper limit of its stroke; Fig. 12 is a view similar to Figs. 9 to 11 showing the condition of the parts when the valve has been returned to its intermediate position on the final downward stroke; Fig. 13 is a bottom plan view of the rotatable element of the selective mechanism, showing it in the position which it occupies in Fig. 12; Fig. 14 is a side view of the regulator arm; and Fig. 15 is a diagrammatic view showing two valves and selective connecting mechanism associated with a single actuating device.

In the drawings we have illustrated our invention as applied to the steam cylinder, $b$, of the charging mechanism of a stoker, as in our prior application for controlling mechanism for stokers, filed June 10, 1910, Serial Number 566,139, of which the present application is a division, but it will of course be understood that the invention is not limited to this particular use.

Adjacent to the cylinder is a valve mechanism D. The valve mechanism is connected to the cylinder by means of short conduits $d$ and $d'$ which serve both as steam supply conduits and as exhaust conduits. Steam is admitted to the valve mechanism from any suitable source as, for example, from a supply pipe E. The valve mechanism is actuated by novel controlling mechanism to be hereinafter described, the controlling mechanism comprising a suitable reciprocating member actuated in any suitable way and acting upon the valve mechanism through a novel adjustable selective connecting means.

In the arrangement shown the actuator is operated by steam which receives steam from the supply pipe E through a branch pipe $f^4$. A master controller F, located at any suitable point and actuated in any suitable way serves to produce variations in the pipe or conduit $f^4$ at regular intervals.

Such variation in pressure may conveniently be produced by connecting the pipe $f^4$ alternately to the supply pipe and to atmosphere.

The valve mechanism is constructed as follows: G represents a valve casing containing a piston valve H. The casing has two ports $g$ and $g'$ communicating, respectively, with the pipes $d$ and $d'$ which lead to the opposite ends of the charging cylinder. $g^2$ is a steam supply pipe, and $g^3$ is the exhaust. As shown most clearly in Figs. 1 and 2, the opposite ends of the valve casing are connected together by a passage $g^4$. The parts are so proportioned that when the valve occupies the position shown in Fig. 2, both of the ports $g$ and $g'$ are shut off from the steam inlet and communicate directly with the adjacent ends of the valve casing; the pipe $d$ exhausting through the adjacent end of the casing and through the exhaust pipe $g^3$; and the pipe $d'$ exhausting through the adjacent end of the casing, the port or passage $g^4$ and thence through the exhaust pipe. When the valve is moved downwardly, the pipe $d'$ remains connected with the exhaust and the pipe $d$ is connected with the supply pipe $g^2$. Thus steam is admitted into one end of the cylinder while the other end remains exhausted. When the valve is moved upwardly, the first operation is to cut off steam from the pipe $d$ and connect this pipe to the exhaust, a continued upward movement resulting in the closing of communication between the exhaust and pipe $d'$ and placing this pipe in communication with the steam supply. Consequently, in the upper position of the valve, steam is admitted to the end of the cylinder which was exhausted in the other extreme position of the valve. It will be seen that each end of the cylinder is exhausted before steam can enter the opposite end so that there is no back pressure at the beginning of a power stroke, and the action will be quick and positive. Furthermore, by placing the valve close to the cylinder, the clearance in the cylinders and pipes is reduced to a minimum so that quicker action and greater efficiency is obtained than in the arrangement where the valve is at a considerable distance from the cylinder, requiring long connections which increase the clearance.

We prefer to actuate the valve by some local movable member which is controlled by the master controller and which is operatively connected to the valve by some sort of adjustable selective connecting mechanism. In the arrangement shown, the movable actuating member is in the form of a piston I arranged within a cylinder I' which may conveniently be formed in the one casting with the valve casing. The piston rod $i$ projects through one end of the cylinder and between it and the valve stem $h$ is the selective connecting mechanism which will be hereinafter described. The pipe $f^4$ communicates with the interior of the cylinder I' at the end opposite that through which the piston rod projects. It will be seen that whenever steam is admitted into the pipe $f$, it enters the cylinder I' beneath the piston and forces the piston upwardly. The downward movement of the piston may be accomplished in any suitable way as, for example, by imposing upon it a constant pressure in opposition to the pressure from below. In the arrangement shown, the upper end of the cylinder is connected to the main steam pipe E by means of a branch pipe $i'$. The upper side of the piston, will therefore be always subjected to the steam pressure of the system; but, by reason of the smaller effective area of the upper side of the piston, an upward movement of the piston will be produced whenever steam is admitted upon the underside. When the pipe $f$ is exhausted the steam escapes from the lower end of the cylinder and the piston is forced downwardly by reason of the steam above it. If desired, a regulating valve $I^2$, illustrated as a needle valve, may be arranged between the pipe $f^4$ and the interior of the cylinder so as to vary the rate of admission of steam beneath the piston. It will thus be seen that as the blower revolves, the master valve is driven so as alternately to admit steam to and exhaust steam from the lower end of the actuating cylinder.

The selective connecting mechanism is most clearly shown in Fig. 2 and, on a larger scale, in Figs. 4 to 14. Mounted upon the bracket K above the upper ends of the piston rod and valve stem, is a horizontal stud L. Upon the stud are mounted, the one in front of the other, a rotatable selective element M, a driving member N and a driven member O. These three members are shown in detail in Figs. 5 to 7, they being illustrated in the positions which they occupy in Fig. 2 where the valve is in its intermediate position. Each of the members M, N and O, is loosely mounted upon the stud so as to be free to rotate thereon. The member N is connected to the upper end of the piston rod $i$ by means of a link $i^2$ and the member O is connected to the upper end of the valve stem by means of a link $h'$. The member M is in the form of a ratchet wheel having a mutilated portion $m$ and laterally projecting hub members M' and $M^2$. The driving member N carries a pawl N' which is adapted to engage the ratchet teeth on the member M so as to rotate the latter step by step as the member N is oscillated. The driving member also has a wide pawl $N^2$ having separated noses $n'$ and $n^2$. The nose $n'$ is adapted to ride upon the hub M' which is provided at one point in its periphery with a notch $m'$ into which the nose $n'$ is adapted to drop in a predetermined angular position of the member M. The hub of the member O is provided with a flange $o$ extending circumferentially thereof, the flange being cut away at two points so as to form a stop or lug $o'$. The arm $o^2$ to which the link $h'$ is attached extends radially beside the lug $o'$ near one end of the latter. The parts are so proportioned that the members $o'$ and $o^2$ lie in the path of the nose $n^2$ of the pawl $N^2$, engagement between the lug $o'$ and the pawl being normally prevented, however, by reason of the fact that the pawl is held up as long as the pawl $n'$ is clear of the notch or depression $m'$. The member N carries a third pawl $N^3$, this pawl being double ended and having one end $n^3$, in the plane of the lug $o'$ and the other end $n^4$, in the plane of a lug $m^2$ on the hub $M^2$. P is a spring tending normally to hold the pawl $n^3$ above the lug $o'$ so as to clear the same during the movement of the parts. Q is a pawl engaging with the ratchet teeth on the member M so as to prevent backward movement of this member.

The operation is as follows: Normally the valve occupies the position shown in Fig. 2 and the other parts may be assumed to be occupying the positions illustrated in this figure. As heretofore explained, the operation of the master controller causes the piston I to be reciprocated and this motion, it will be seen, is transformed into an oscillatory motion of the member N. When steam is admitted under the piston it causes the member N to be turned in the clockwise direction, the pawl $N'$ engaging with the ratchet teeth on the selective element and turning the latter through a predetermined angle. When the piston moves downwardly, the pawl travels backward over the ratchet teeth and the member M remains stationary by reason of the engagement of the pawl Q with the ratchet teeth. Upon each upward movement of the piston the member M is moved forward a step, the length of which depends upon a regulating device to be hereinafter described, until the notch $m'$ is brought beneath the nose $n'$ of the pawl $N^2$ as indicated in Fig. 9. This permits the nose $n^2$ of the pawl to drop down in front of the lug $o'$ on the driven member. During the next upward stroke of the piston the member M is rotated by the member $n'$ and, when the member $n^2$ engages with the lug $o'$ the driven member is carried along thereby until the parts assume the positions indicated in Fig. 10. The valve is now in its lowermost position so that steam is admitted to the ram end of the charging cylinder. Upon the next downward stroke of the actuating piston, the driven member remains stationary until the pawl $n^3$ engages with the lug $o'$ and thereafter the driven member is turned in the counterclockwise direction until the position of the parts illustrated in Fig. 12 is reached. It will be seen that in Fig. 10 the lug $m^2$ lies in the path of the pawl $n^4$ so that the latter is raised thereby upon the backward movement of the driving member, thus forcing the pawl $n^3$ downwardly behind the lug $o'$. When the parts occupy the positions indicated in Fig. 11 the valve is at the upper end of its movement so that steam is being admitted to the front end of the charging cylinder and the ram forced inwardly to feed more coal into the furnace. On the next down stroke of the actuating piston the nose $n^2$ of the pawl $N^2$ rides above the lug $o'$ (because the notch $m'$ has passed from beneath the nose $n'$) and engages with the arm $o^2$, causing the driven member to be rotated from the position indicated in Fig. 11 to that indicated in Fig. 12. When the piston moves downwardly the driven member and the member M remain stationary so that after the downward stroke the parts are again in the positions indicated in Fig. 4 and the valve will thereafter remain stationary in its intermediate position until the member M has been moved around, step by step, and brought again into the position indicated in Fig. 9. It will be seen that in moving from the positions indicated in Fig. 11 to those indicated in Fig. 12, the pawl $n^4$ engages with the lug $m^2$ and causes the member M to be partially rotated independently of the pawl $N'$.

It will now be seen that the valve is positively moved into its three positions by three successive strokes of the actuating piston, while thereafter it remains in the exhaust position for an interval of time depending upon the length of the steps through which the rotary member of the selective mechanism is moved.

The regulating arrangement is most clearly shown in Figs. 3, 4, 8, 9 and 14. Behind the member M we have mounted upon the stud a swinging arm R having a laterally projecting flange $r$ which is adapted to overlie the ratchet teeth on the member M. Upon the free end of the arm is a spring finger or dog S which is adapted to enter any one of a series of openings T arranged in the arc of a circle in the bracket K. In the arrangement illustrated there are nine of these openings, and the pin is shown in the middle opening. By examining Fig. 4 it will be seen that the pawl $N'$ rides upon the flange $r$ and does not engage with one of the ratchet teeth until the driving member has moved through a considerable angle. It will be seen that if the regulating arm is swung downwardly so as to bring the pin into one of the lower holes, the pawl will engage with the ratchet teeth at an earlier point in the movement of the driving member; while upon swinging the regulating arm upwardly, into one of the upper holes, the pawl will not engage with a ratchet tooth until a later point in the upward stroke of the driving member. By shifting the regulating arm up or down from the position indicated, the valve may be caused to be actuated less often or with greater frequency during a given number of strokes of the actuating member I.

Fig. 9 makes clear another feature of the selective mechanism. It will be seen that during the upward stroke which brought the parts into the positions indicated, the pawl N' rode for a time upon the mutilated portion $m$ of the member M so that the last step through which the member M was rotated was shorter than those preceding it; the purpose of the mutilated portion being to compel the pawl to engage with the tooth immediately in advance of the mutilated portion whenever the last angle through which the rotary element is to be moved before it is brought into the position indicated in Fig. 9 is less than the angle through which it was moved in the preceding step and compelling the rotary element to be carried into a final position which brings the notch $m'$ beneath the pawl $n'$.

It may sometimes be desirable to have a single actuating member for a plurality of valves and this may conveniently be accomplished by introducing between each valve and the actuating member a selective mechanism similar to that heretofore described. We have shown diagrammatically such an arrangement in Fig. 15, two valves being indicated at G°, G° and a single actuating mechanism at $l°$. The selective mechanism is illustrated as differing from the one just described in that a single revoluble shaft L° takes the place of the stub shaft, the driving members N being fixed to this shaft, and the shaft being oscillated by the actuating member.

While we have illustrated and described with particularity only a single form of our invention,—one including a steam operated actuator,—we do not desire to be limited to the specific details so illustrated and described; but intend covering all constructions and arrangements, regardless of the type of actuator and other details, which fall within the terms employed in the definitions of our invention constituting the appended claims.

We claim:

1. In combination, a valve having a plurality of positions, a reciprocating member, selective connecting mechanism arranged between said member and said valve for connecting them together so as to cause said valve to be moved successively into its several positions through consecutive strokes of said member and to remain stationary during a predetermined number of subsequent strokes of said member, and actuating means for said selective mechanism associated with said member.

2. In combination, a valve having a plurality of positions, a reciprocating member, selective connecting mechanism arranged between said member and said valve for connecting them together so as to cause said valve to be moved successively into its several positions through consecutive strokes of said member and to remain stationary during a predetermined number of subsequent strokes of said member, actuating means for said mechanism associated with said member, and a regulating device for controlling said actuating means so as to vary the number of strokes made by said member while said valve remains stationary.

3. In combination, a valve having a plurality of positions, a reciprocating member, selective connecting mechanism between said valve and said member including an element having a working position wherein it effects inoperative connection between said valve and said member so as to cause said valve to be brought into its several positions during consecutive strokes of said member, said element also having a plurality of idle positions, and actuating means for said selective mechanism associated with said member for moving said element through successive cycles of positions.

4. In combination, a valve having a plurality of positions, a reciprocating member, selective connecting mechanism between said valve and said member including an element having a working position wherein it effects an operative connection between said valve and said member so as to cause said valve to be brought into its several positions during consecutive strokes of said member, said element also having a plurality of idle positions, actuating means for said mechanism associated with said member for moving said element through successive cycles of positions, and a regulating device for said actuating means arranged to vary the relation between number of the idle and working positions of said element.

5. In combination, a valve having a plurality of positions, a reciprocating member, selective connecting mechanism between said member and said valve including an element having a working position in which it effects an operative connection between said member and said valve so as to cause said valve to be brought successively into its several positions during consecutive strokes of said member, and actuating means associated with said member for causing said element to be moved through one or more idle positions and back to said working position after the valve has been brought into the last of its several positions.

6. In combination, a valve having a plurality of positions, a reciprocating member, selective connecting mechanism between said member and said valve including an element having a working position in which it effects an operative driving connection between said member to said valve so as to cause said valve to be brought successively into its several positions during consecutive strokes of said member, actuating means associated with said member for causing said element to be moved through one or more idle positions and back to said working position after the valve has been brought into the last of its several positions, and a regulating device for said actuating means for varying the number of idle positions in each cycle of operations.

7. In combination, a valve having a plurality of positions, a reciprocating member, selective connecting mechanism between said member and said valve having a rotary element, said selective mechanism being constructed and arranged so as to cause said valve to be moved successively into its several positions during consecutive strokes of said member when said element is brought to a predetermined angular position, and actuating means for said rotary element associated with said member.

8. In combination, a valve having a plurality of positions, a reciprocating member, selective connecting mechanism between said member and said valve having a rotary element, said selective mechanism being constructed and arranged so as to cause said valve to be moved successively into its several positions during consecutive strokes of said member when said element is brought to a predetermined angular position, and actuating means for said rotary element associated with said member, said actuating device being constructed and arranged to move said element step by step from the position which it occupies when the valve reaches its last position back to said predetermined angular position.

9. In combination, a valve having a plurality of positions, a reciprocating member, selective connecting mechanism between said member and said valve having a rotary element, said selective mechanism being constructed and arranged so as to cause said valve to be moved successively into its several positions during consecutive strokes of said member when said element is brought to a predetermined angular position, actuating means for said rotary element associated with said member, said actuating means being constructed and arranged to move said element step by step from the position which it occupies when the valve reaches its last position back to said predetermined angular position, and a regulating device for varying the angular length of the steps through which said element is moved by said actuating means.

10. In combination, a valve having two extreme positions and an intermediate position, a reciprocating member, selective connecting mechanism between said valve and said member including a revoluble element, said selective mechanism being constructed and arranged to cause said member to move said valve successively into its extreme positions and then into the intermediate position during successive strokes of said member after said element reaches a predetermined angular position and thereafter to cause said valve to remain in the intermediate position until said element has been returned to said predetermined angular position, and actuating means associated with said member for moving said revoluble element step by step into said predetermined angular position after the valve has been brought into its intermediate position.

11. In combination, a valve having two extreme positions and an intermediate position, a reciprocating member, selective connecting mechanism between said valve and said member including a revoluble element, said selective mechanism being constructed and arranged to cause said member to move said valve successively into its extreme positions and then into the intermediate position during successive strokes of said member after said element reaches a predetermined angular position and thereafter to cause said valve to remain in the intermediate position until said element has been returned to said predetermined angular position, actuating means associated with said member for moving said revoluble element step by step into said predetermined angular position, after the valve has been brought into its intermediate position, and regulating means associated with said actuating means for varying the length of the steps by which said element is brought into said predetermined angular position.

12. In combination, a valve having three positions, a reciprocating member, a selective connecting mechanism between said valve and said member including three pawls and a revoluble controlling element for said pawls, the parts being so constructed and arranged as to cause said valve to be moved by said pawls successively into its three positions during consecutive strokes of said member after said element has reached a predetermined angular position and thereafter to leave said valve stationary, and an actuating device for said element associated with said member and arranged to move said element step by step after the valve has been brought into its third position until said element is carried into said predetermined angular position.

13. In combination, a valve having three positions, a reciprocating member, a selective connecting mechanism between said valve and said member including three pawls and a revoluble controlling element for said pawls, the parts being so constructed and arranged as to cause said valve to be moved successively into its three positions during consecutive strokes by said pawls of said member after said element has reached a predetermined angular position and thereafter to leave said valve stationary, and an actuating device for said element associated with said member and arranged to move said element step by step after the valve has been brought into its third position until said element is carried into said predetermined angular position, and a regulator for said device arranged to vary the length of the steps through which said element is moved.

14. In combination: a valve having two extreme positions and an intermediate position; a reciprocating member; selective connecting mechanism between said member and said valve including a rotary element; the parts being so constructed and arranged that when said rotary element reaches a predetermined angular position said mechanism effects a driving connection between said member and said valve so as to move the valve from the intermediate position to an extreme position during one stroke of said member, to move the valve from the latter position to the other extreme position upon the return stroke of said member and then to move the valve back to the intermediate position on the next stroke of said member; means associated with said mechanism for moving said element out of said predetermined angular position during the actuation of the valve; and said valve thereafter remaining stationary until said element is again brought into said predetermined angular position; and actuating means for said element associated with said member for moving said element toward said predetermined angular position while the valve remains stationary.

15. In combination: a valve having two extreme positions and an intermediate position; a reciprocating member; selective connecting mechanism between said member and said valve including a rotary element; the parts being so constructed and arranged that when said rotary element reaches a predetermined angular position said mechanism effects a driving connection between said member and said valve so as to move the valve from the intermediate position to an extreme position during one stroke of said member, to move the valve from the latter position to the other extreme position upon the return stroke of said member, and then to move the valve back to the intermediate position on the next stroke of said member; means associated with said mechanism for moving said element out of said predetermined angular position during the actuation of the valve; and said valve thereafter remaining stationary until said element is again brought into said predetermined angular position; actuating means for said element associated with said member for moving said element toward said predetermined angular position while the valve remains stationary; and a regulator associated with said actuating means for varying the number of strokes of said member required to return said element to said predetermined angular position.

16. In combination: a valve having two extreme positions and an intermediate position; a reciprocating member, selective connecting mechanism between said member and said valve including a rotary element having a ratchet wheel thereon; the parts being so constructed and arranged as to cause said member to be operatively connected to said valve when said element occupies a predetermined angular position so as to move said valve from the intermediate position into each extreme position and back again to the intermediate position during consecutive strokes of said member and then to remain stationary until said element again reaches said predetermined angular position; said mechanism including means for carrying said element out of said predetermined angular position during the actuation of the valve; and a pawl associated with said member and engaging with said ratchet wheel for moving said element step by step toward said predetermined angular position after each cycle of operations of the valve.

17. In combination: a valve having two extreme positions and an intermediate position; a reciprocating member, selective connecting mechanism between said member and said valve including a rotary element having a ratchet wheel thereon; the parts being so constructed and arranged as to cause said member to be operatively connected to said valve when said element occupies a predetermined angular position so as to move said valve from the intermediate position into each extreme position and back again to the intermediate position during consecutive strokes of said member and then to remain stationary until said element again reaches said predetermined angular position; said mechanism including means for carrying said element out of said predetermined angular position during the actuation of the valve; and a pawl associated with said member and engaging with said ratchet wheel for moving said element step by step toward said predetermined angular position after each cycle of operations of the valve, and a regulator coöperating with said pawl to vary the angular movement which said element makes during one stroke of said member.

18. In combination: a valve having two extreme positions and an intermediate position; a reciprocating member; selective connecting mechanism between said member and said valve including a rotary element having a ratchet wheel thereon; the parts being so constructed and arranged as to cause said member to be operatively connected to said valve when said element occupies a predetermined angular position so as to move said valve from the intermediate position into each extreme position and back to the intermediate position during consecutive strokes of said member and then to remain stationary until said element again reaches said predetermined angular position; said mechanism including means for carrying said element out of said predetermined angular position during the actuation of the valve; and a pawl associated with said member and engaging with said ratchet wheel for moving said element step by step toward said predetermined angular position after each cycle of operations of the valve, and a regulator coöperating with said pawl to vary the angular movement which said element makes during one stroke of said member, said ratchet wheel being mutilated so as to cause said element to come to rest in said predetermined angular position regardless of the angular movement of said element during a single stroke of said member.

In testimony whereof, we sign this specification in the presence of two witnesses.

WILLIAM J. KENNEY.
HENRY P. GROHN.

Witnesses:
FRED F. DAUR,
H. C. TRACY.